United States Patent
Yan et al.

(10) Patent No.: US 7,958,062 B2
(45) Date of Patent: Jun. 7, 2011

(54) METHOD AND SYSTEM OF CREATING HEALTH OPERATING ENVELOPE FOR DYNAMIC SYSTEMS BY UNSUPERVISED LEARNING OF A SEQUENCE OF DISCRETE EVENT CODES

(75) Inventors: Weizhong Yan, Clifton Park, NY (US); Anil Varma, Clifton Park, NY (US); Piero Patrone Bonissone, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 982 days.

(21) Appl. No.: 11/755,898

(22) Filed: May 31, 2007

(65) Prior Publication Data

US 2008/0091715 A1   Apr. 17, 2008

Related U.S. Application Data

(60) Provisional application No. 60/803,604, filed on May 31, 2006.

(51) Int. Cl.
*G06N 5/00* (2006.01)

(52) U.S. Cl. .......................................... 706/12; 706/45
(58) Field of Classification Search .................. 706/12, 706/45
See application file for complete search history.

(56) References Cited

OTHER PUBLICATIONS

Yu, Analyses of Power System Vulnerability and Total Transfer Capability, Doctoral Dissertation, Texas A&M University, 2005, pp. 1-123.*

* cited by examiner

*Primary Examiner* — Wilbert L Starks, Jr.
(74) *Attorney, Agent, or Firm* — Bracewell & Giuliani LLP

(57) ABSTRACT

A method and system for creating healthy operating envelope from only data samples obtained during normal operation/behavior of dynamic systems is provided. This method determines healthy operating envelope by clustering a stream of discrete event code sequences from the underlying system under normal operation condition only. The method is unsupervised, that is, requiring no prior knowledge of event code patterns corresponding to different operation conditions. Such created envelope can be used for fault detection and health monitoring of dynamic systems.

3 Claims, 5 Drawing Sheets

METHOD AND SYSTEM OF CREATING HEALTH OPERATING ENVELOPE FOR DYNAMIC SYSTEMS BY UNSUPERVISED LEARNING OF A SEQUENCE OF DISCRETE EVENT CODES

RELATED APPLICATIONS

This application claims the benefit of U.S. Provisional Patent Application No. 60/803,604 filed on May 31, 2006 and entitled "AUTOMATED KERNEL EXTRACTION SYSTEM AND APPROACH FOR FINDING DISCRIMINATORY FEATURES", which is hereby incorporated by reference in its entirety for all purposes.

This application is related to U.S. patent application Ser. No. 11/755,924 fled on May 31, 2007 and entitled "SYSTEM AND METHOD FOR DEFINING NORMAL OPERATING REGIONS AND IDENTIFYING ANOMALOUS BEHAVIOR OF UNITS WITHIN A FLEET, OPERATING IN A COMPLEX, DYNAMIC ENVIRONMENT", which is hereby incorporated by reference in its entirety for all purposes.

This application is related to U.S. patent application Ser. No. 11/755,893 filed on May 31, 2007 and entitled "AUTOMATED KERNEL EXTRACTION", which is hereby incorporated by reference in its entirety for all purposes.

This application is related to U.S. patent application Ser. No. 11/682,025 filed on Mar. 5, 2007 and entitled "Kernel Split Find: A Method for Fault Detection and Localization in Time Series and Spatial Data", which is hereby incorporated by reference in its entirety for all purposes.

TECHNICAL FIELD OF THE INVENTION

The present invention relates generally to the field of health monitoring of dynamic mechanical systems.

BACKGROUND OF THE INVENTION

Machine health monitoring is an indispensable part of condition-based maintenance (CBM). Knowing machine health at any given time helps to minimize unexpected downtimes, optimize maintenance schedule, maximize mission readiness, increase safety, and, ultimately, reduce life-cycle costs. Fault detection is one of the key enablers of machine condition monitoring.

Fault detection has been conventionally treated as a classification problem, i.e., to classify machine health status into either normal or abnormal (faulty) conditions. This classification design requires well-distributed data samples representing both normal condition and different faulty conditions. In most real-world applications data samples for normal condition are readily available. However, data samples for abnormal conditions are not. Data samples associated with abnormal condition are difficult or costly to obtain. This is compounded by the need to obtain a sufficient number of data samples concerning all different faulty conditions.

A more cost-effective design strategy designs a fault detection system using data samples based on normal condition only. Under this design strategy, a model that accurately characterizes normal behavior is developed. A faulty condition is declared when system behavior deviates by a pre-defined amount from the model-described normal behavior. Such design strategy is known as "novelty detection". There are numerous approaches for novelty detection, ranging from statistics to neural networks.

Prior systems may for example disclose a method for ascertaining anomalies in an electric motor by computing and processing a set of fast Fourier Transforms (FFTs) of the supply current waveforms for a motor known to be in a normal condition. The method includes a step of clustering the input vectors into several cluster groups using Ward's method and outputting anomaly warning signal if a new input sample for a motor under supervision is not inside any of these clusters.

Prior systems within the area of analyzing fault logs disclose methods that aid a field engineer in analyzing fault logs of a malfunctioning machine and determining causes and/or recommended repair actions.

Thus, improved and efficient means to identifying a normal operation envelope may be required.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
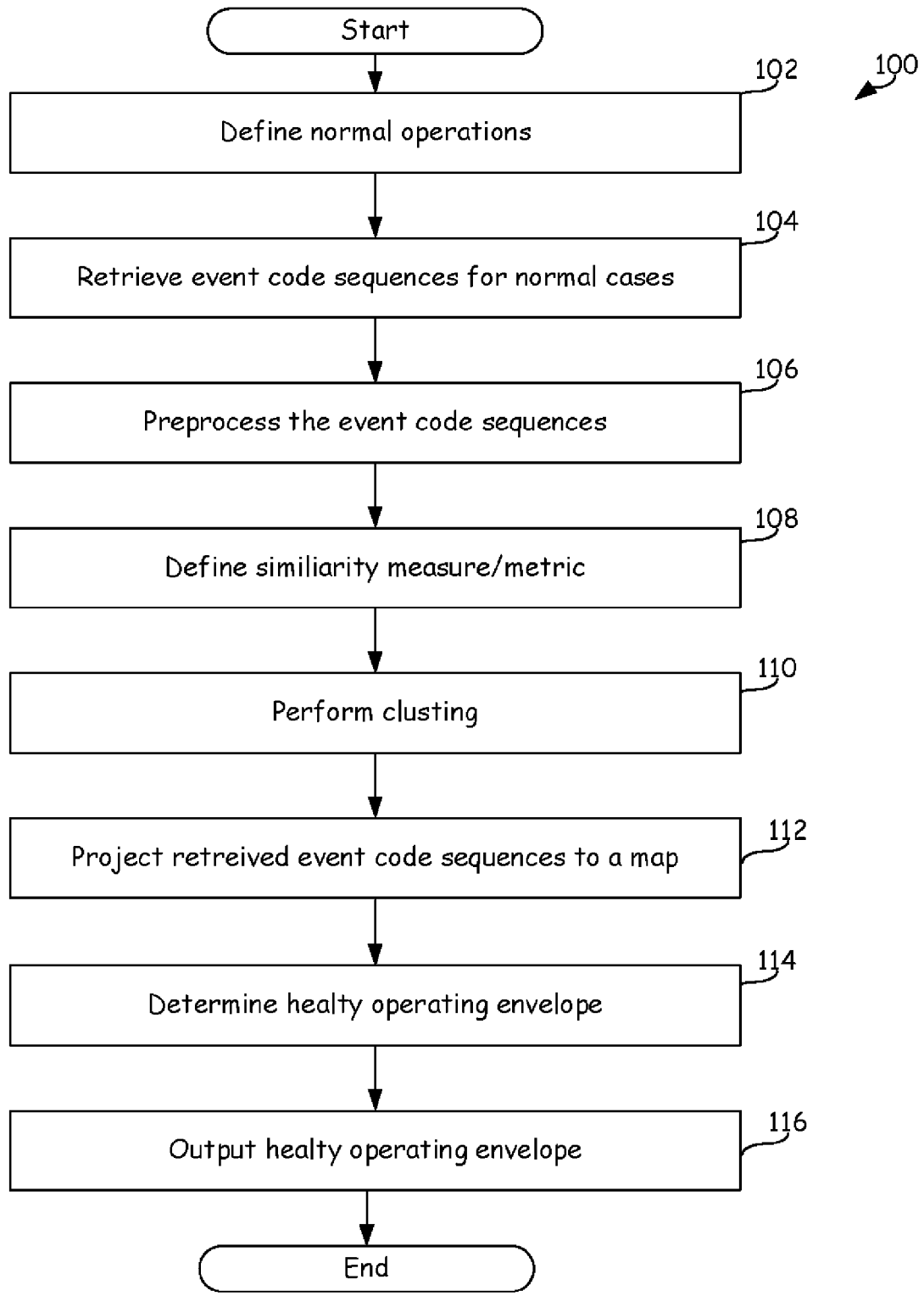
FIG. 1 provides a flow diagram that illustrates the overall process in accordance with embodiments of the present invention.

Preferred embodiments of the present invention are illustrated in the FIGs., like numerals being used to refer to like and corresponding parts of the various drawings.

The embodiments of the present invention provide a system and method that may substantially addresses the above identified needs as well as others.

The present invention relates generally to the field of health monitoring of dynamic mechanical systems such as but not limited to aircraft engines, and more specifically, to fault detection and novelty detection of such systems. More specifically, embodiments of the present invention may use discrete event codes generated by the underlying system under normal operation condition to determine healthy operating envelope for the purpose of fault detection and condition monitoring.

Embodiments of the present invention may provide a method of defining normal operation envelope for fault detection and health monitoring of dynamic systems. Embodiments of the present invention may apply Self-organizing map (SOM), also known as self-organizing feature map (SOFM), on event code sequences to create or define health operation envelope for the purpose of fault detection and condition monitoring of dynamic systems.

Embodiments of the present invention may also perform pattern recognition on a stream of event code sequences to derive information indicative to system conditions, thus to perform fault detection.

Conventionally, recorded sensor measurements (continuous or non-continuous) may be used for fault detection and machine health monitoring. Measurements from sensors that are properly functioning signify conditions of the underlying system/machine, i.e., pattern signatures of the measurements generally correlate well with condition of the system. However, sensor failure or malfunction and sensor noise may make sensor measurements ineffective for fault detection.

A complex system, such as an aircraft, often includes elaborate controls and sensors that generate event logs regarding operation of the system. Anomalous operating conditions of the system are detected by the sensors and trigger the generation of an entry in the event log. Hence event logs, especially event occurring patterns, contain indicative information to system condition and thus can be directly used for fault detection. However, an event log is noisy and typically consists of an overwhelmingly large number of event codes occurring at the same time. This makes manually analyzing the event log to derive indicative information almost impossible.

Self-organizing map (SOM), also known as self-organizing feature map (SOFM), is a neural network model. SOM performs two essential functions, namely vector quantization and vector projection. Vector quantization discovers prototype vectors that represent the data, i.e., approximate probability density function of the data in the input space. Vector projection, on the other hand, performs a nonlinear, topology-preserving projection or mapping of data from a high dimensional input space to a low (typically 2) dimensional space. SOM is, therefore, a good tool for both clustering and visualization. Since SOM is an unsupervised learning model, SOM can be used for characterizing data without model and a priori knowledge.

FIG. 1 provides a flow diagram that illustrates the overall process in accordance with embodiments of the present invention. Detailed descriptions of each of the process steps are given as follows. Operations 100 begin with step 102 where normal operations are to be defined. Normal operations may be defied as a "true" normal (fault-free) operation condition of the system, as opposed to normal condition decisions given by a diagnostic system. With normal operation defined, one can identify normal cases from historical cases that are available. Event code sequences for those normal cases are then retrieved in step 104.

Figure 2:
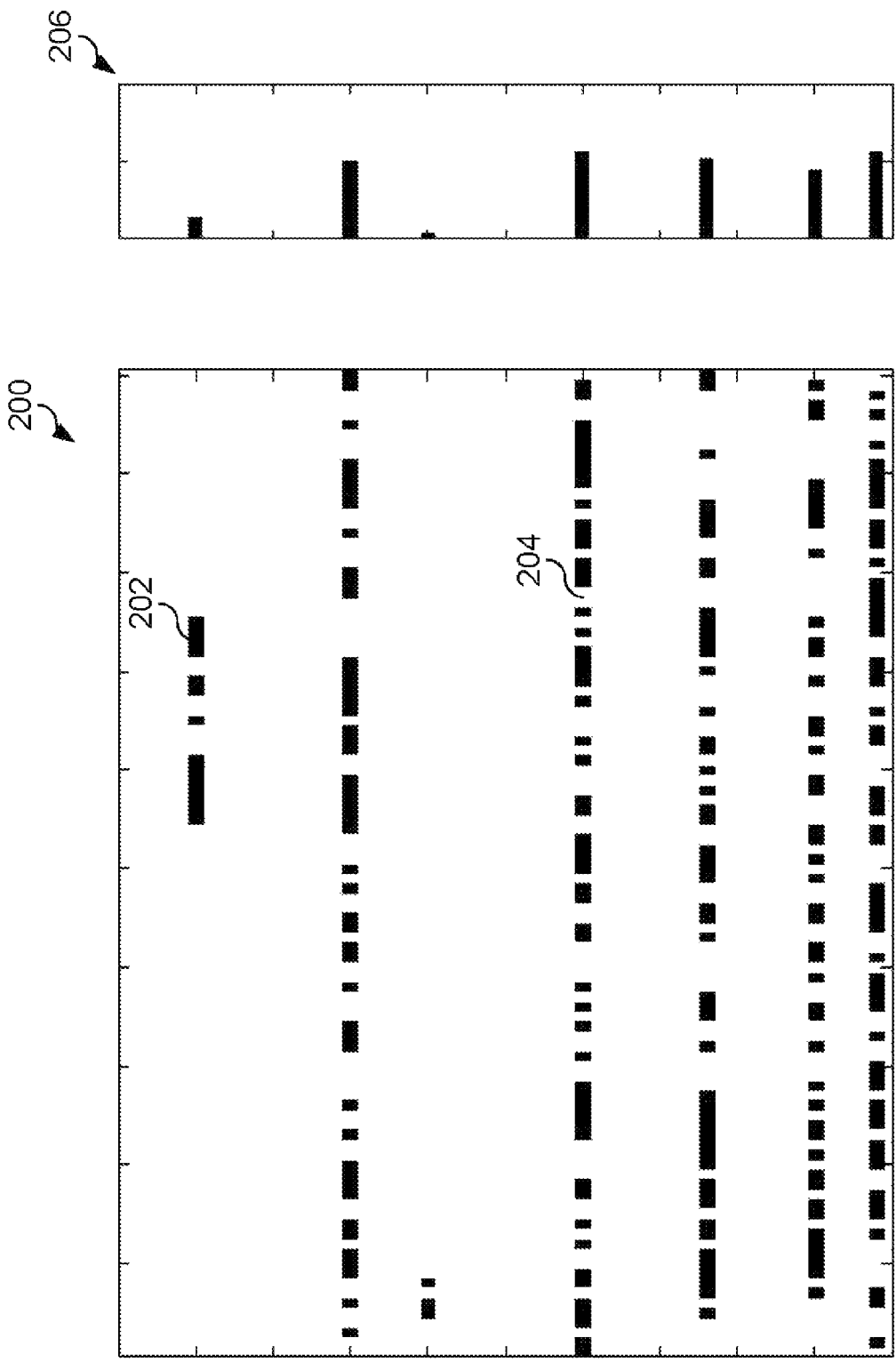
FIG. 2 shows a typical event code sequence in accordance with embodiments of the present invention.

A typical event code sequence 200 is shown in FIG. 2A, where x-axis indicates time stamps and y-axis represents even codes. A dark box 202 indicates the event code is activated, while white space 204 represents those event codes that are not been activated within the period of time. An event code sequence can be summarized as a vector where each element of the vector is the counts of corresponding event codes, or a histogram 206 as shown in FIG. 2B.

Figure 3:
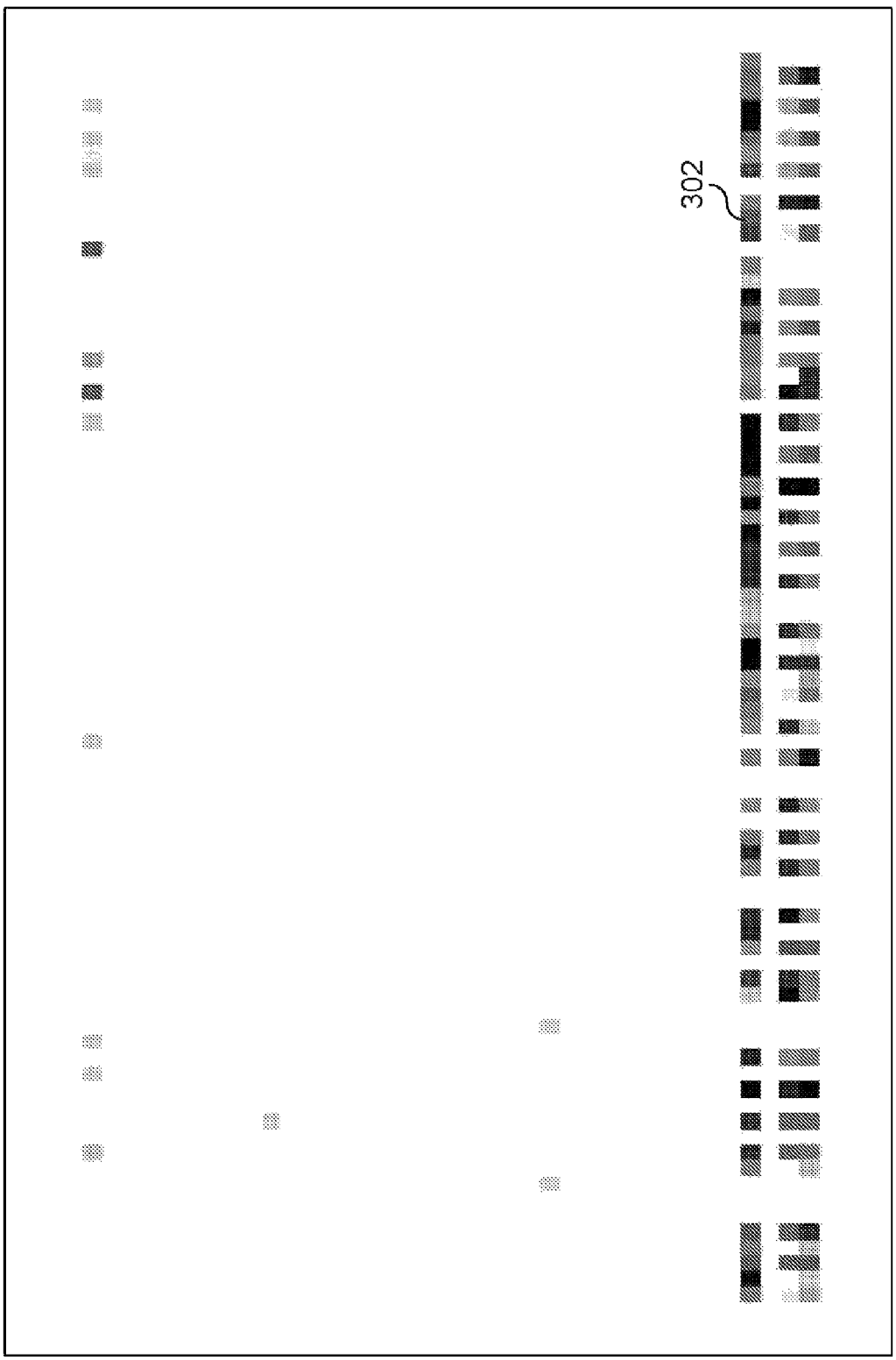
FIG. 3 illustrates a stream of event codes sequences in accordance with embodiments of the present invention.

FIG. 3 illustrates a stream of event codes sequences in accordance with embodiments of the present invention. These event code sequences may be from a series of consecutive flights/missions and may form a stream of event code sequences 302 as shown in FIG. 3 where shading represent number of counts. A stream of sequences can be represented by an m-by-n matrix, where m is the number of different event codes over all flights, and n is the total number of flights. The entry c(i,j) of the matrix represents the number of occurrences (counts) of $i^{th}$ event code during $j^{th}$ flight.

Returning to the flow diagram of FIG. 1, in Step 106, the retrieved even code sequences are preprocessed. Preprocessing includes normalization and nuisance event codes suppression. One can normalize the counts per flight by the total count of the flight, which results in change of entries from counts to frequencies. Thus, the normalized entry f(i,j) is computed as:

$$f(i, j) = \frac{c(i, j)}{\sum_{i=1}^{m} c(i, j)}$$

One can now represent each flight "j" by a string (vector) containing the frequencies:

[f(1,j),f(2,j), . . . , f(m,j)]

One can also normalize the frequencies by duration to account for flight duration difference among different flights.

Nuisance event codes are those occurring almost all the time (i.e., an extremely large frequency entry in frequency strings). Such event codes unlikely are indicative to the condition of the system. However, in distance calculation, the large frequency entries mask the contribution of smaller frequency entries, i.e., less frequently occurring event codes, thus makes the method less effective. To reduce the mask effect and emphasize the importance of less frequent event codes, we suppress these nuisance event codes by limiting the maximum frequency entries of a sequence to 2 times of standard deviation of all entries of a flight, that is, for $j^{th}$ flight, $f(i,j) \leq 2\sigma_j$ for i=1, 2, . . . m, where $\sigma_j$ is the standard deviation of $j^{th}$ flight sequence.

Step 108 defines an appropriate similarity measure/metric required for clustering. As discussed above, each sequence (flight) is represented as a vector with frequencies being its elements. Any distance measure for vectors can be used to calculate similarity between two vectors. In certain embodiments of the present invention, the Manhattan distance for measuring similarity between two event code sequences may be used. Let $x=\{x_1, x_2, \ldots x_m\}$ and $y=\{y_1, y_2, \ldots y_m\}$ be the two event code sequences, the Manhattan distance between x and y is defined as:

$$d_M = \sum_{i=1}^{m} |x_i - y_i|$$

Given the preprocessed event code sequences and the similarity measure, clustering is performed in Step 110 to characterize the event code sequences corresponding to normal operating condition of the system. While clustering can be performed using many known clustering techniques, certain embodiments of the present invention may utilize self-organizing map (SOM) for clustering.

SOM is a neural network algorithm based on unsupervised competitive learning. The network neurons are usually arranged on a rectangular or hexagonal grid of 2D map, and each grid node i on the map is also associated with an m-dimensional prototype vector, $w_i=[w_{i1}, w_{i2}, \ldots w_{im}]^T$ in m-dimensional input space. The network training is an iterative procedure and consists of two steps. The first is to find the best matching unit (BMU) of the current input vector. BMU is the prototype vector that is the closest to the current input vector.

The second step is to update the prototype vectors or neurons. Unlike in other competitive learning where only a single unit is updated, in SOM training, all neurons within certain neighborhood of the BMU are updated according to $w_i(t+1)=w_i(t)+\alpha(t)h(t)[x-w_i(t)]$, where $\alpha(t)$ and $h(t)$ are the learning rate and neighborhood function, respectively, which decrease monotonically with time. Graphically the updating moves the BMU and its topological neighbors as well closer to the input vector in the input space. A successful training results in a map that is topologically ordered so that similar data items in the input space are mapped onto nearby map units. The resultant map can be used to visualize the clusters of input data. On the other hand, the resultant prototype vectors that are well distributed in the input space, approximating probability density function of the data, allow for analytical study of the clusters.

The event code sequences representing normal operating condition of the system are then projected to the 2D map in step 112. The projection is simply to find the BMU for each of the event code sequences and to assign a grid node on the map for it. After performing projection of all input vectors, the grid nodes of the map are partitioned into two groups, active and inactive nodes. Active nodes are the ones that at least one training input claims it as BMU, while inactive nodes are those that no single training input is assigned to them.

Figure 4:
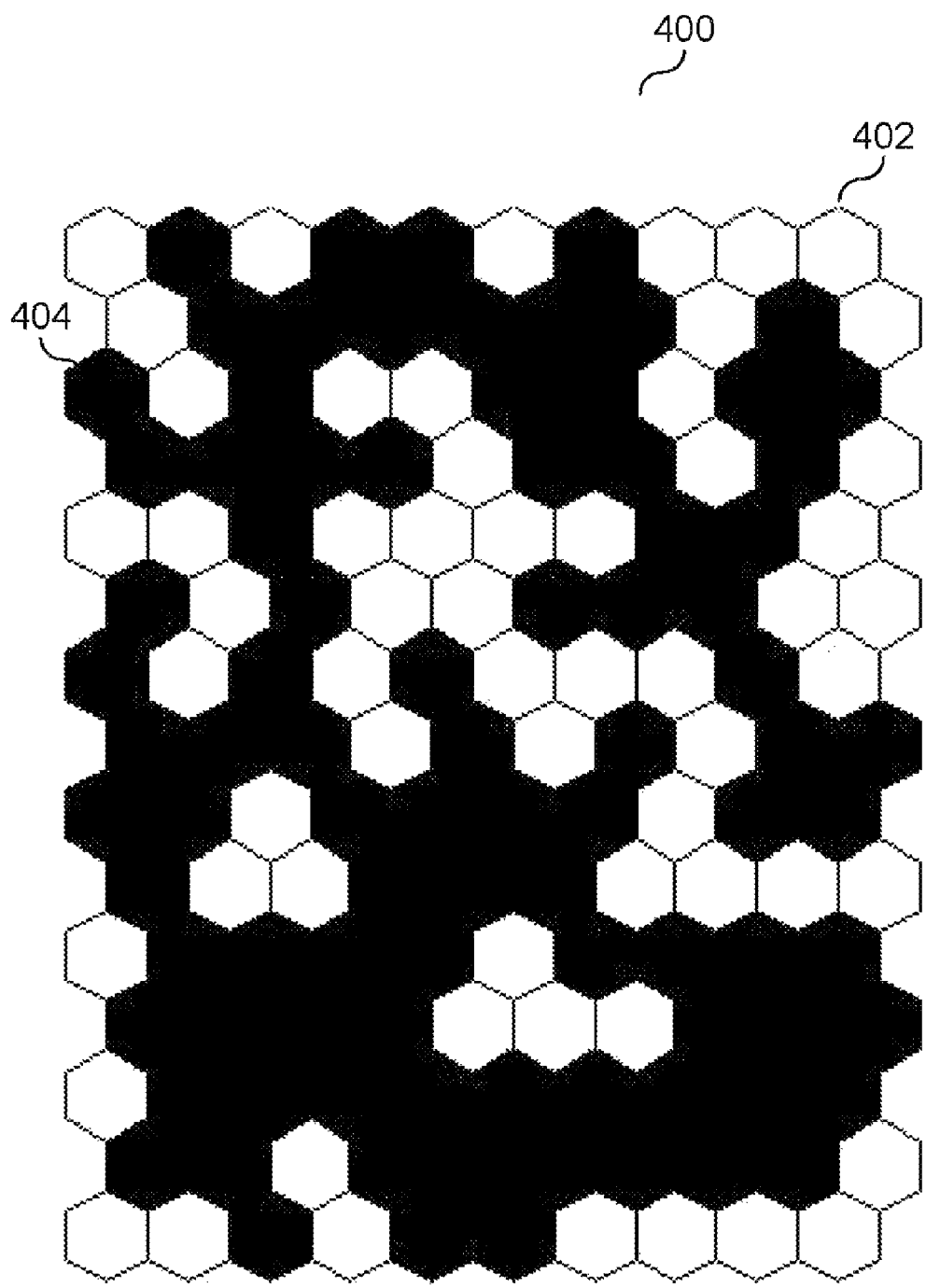
FIG. 4 shows an example of node-partitioned map where active nodes are shown in white color and inactive nodes in black in accordance with embodiments of the present invention.

FIG. 4 shows an example of node-partitioned map 400, where active nodes 402 are shown in white color and inactive nodes in black 404. Since all training inputs are the event code sequences from normal operation condition only, those active nodes on the map as a whole should be the representation of the normal operation condition, thus should constitute the normal operation envelope concerned in the present invention.

Node-partitioned map 400 provides a practical means to visualize the status of the system. For example, a new input (event code sequence) can be declared as a "novel" case if its projection to the map falls onto inactive nodes 404 (black color region in FIG. 4). However, such visual-defined envelope can only be a rough estimate. For example, projection of an input to one of those active nodes 402 (white color nodes in FIG. 4) does not necessarily guarantees a normal condition. Since difficulty exists in integrating the visual-defined envelope to an automated novelty detection system an analytical definition of healthy operation envelope is utilized in certain embodiments of the present invention.

Quantization error may also be used as a metric for fault detection. The concept here is that if the quantization error exceeds a predetermined threshold, the system is deemed to be in a fault condition. Quantization error of an input vector is the distance to its BMU, while threshold is determined based on analyzing the quantization errors of all training inputs. Graphically the concept of using quantization error for fault detection is essentially to approximate the normal operation envelope in input space by a number of hyper-spheres. These hyper-spheres have the same radius that is the predefined threshold value, while centers of these hyper-spheres are located at the points defined by the resultant prototype vectors.

Figure 5:
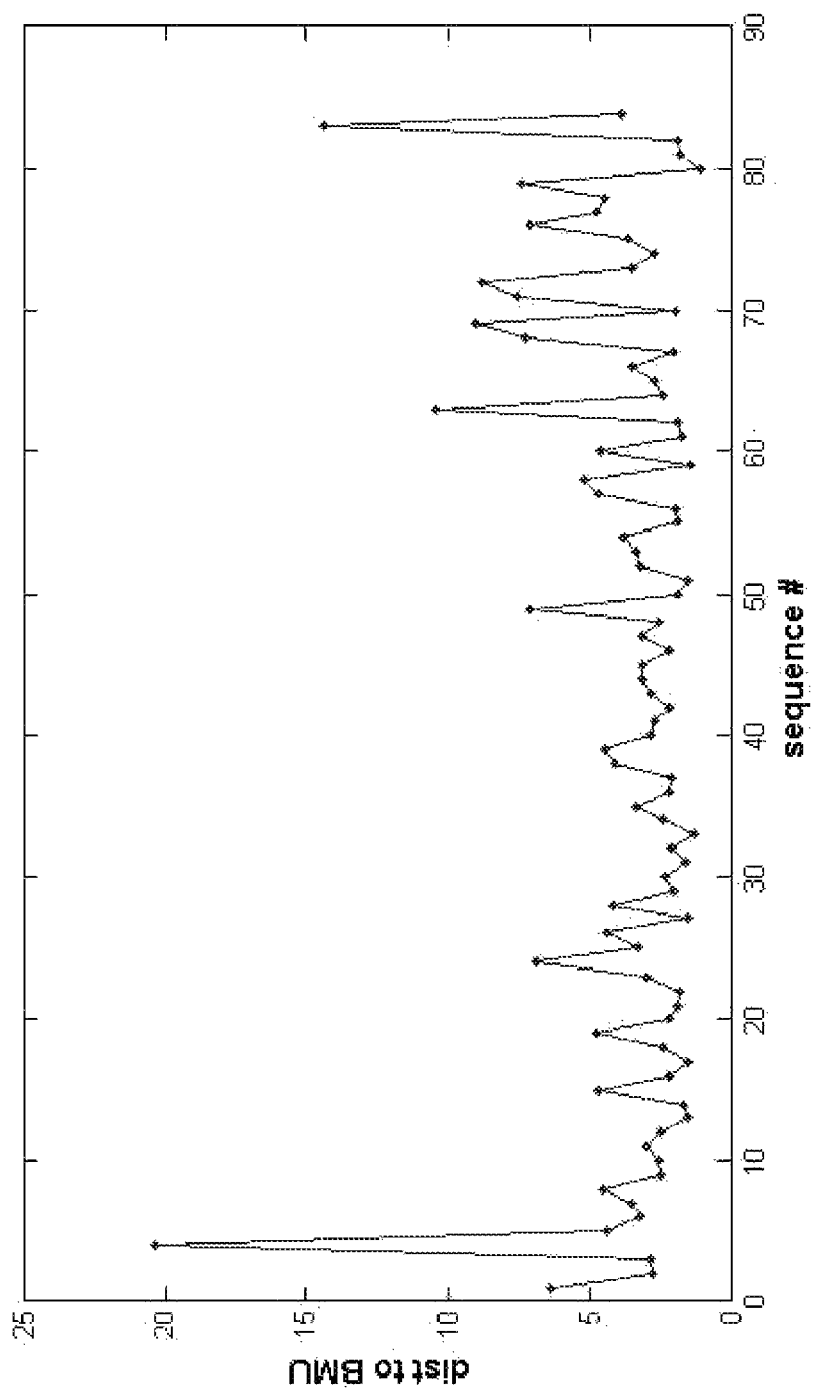
FIG. 5 illustrates the quantization errors of a stream of sequences in accordance with embodiments of the present invention.

FIG. 5 illustrates that quantization errors may vary from one input vector to another. Hence determining a threshold that best strikes the balance between true detection rate and false alarm rate is often a difficult task. Additionally, hyper-spheres with the same radius may not be able to accurately approximate a normal operation envelope.

Certain embodiments of the present invention may use hyper-spheres with individual radii to represent the normal envelope in input space. Each of individual radii is simply the maximum distance between the prototype vector and all input vectors that share the prototype vector as their BMUs. Alternatively, the individual radius can be specified statistically (e.g., 3 times of standard deviation of all distances) if enough numbers of input vectors are available for each prototype vector. Such hyper-spheres eliminate the need of determining the "universal" threshold and give more accurate representation of normal envelope. Mathematically, the healthy operating envelope is defined as:

$$\Omega: \{(p_i \in \mathcal{R}^m, r_i)\}, \text{for } i=1, 2, \ldots n,$$

where $p_i$ and $r_i$ are the $i^{th}$ prototype vector and $i^{th}$ radius, respectively, n is the total number of the active prototype vectors, and m is the dimension of input space.

In summary, embodiments of the present invention provide s method and system for creating healthy operating envelope from only data samples obtained during normal operation/behavior of dynamic systems. Specifically, this method determines healthy operating envelope by clustering a stream of discrete event code sequences from the underlying system under normal operation condition only. The method is unsupervised, that is, requiring no prior knowledge of event code patterns corresponding to different operation conditions. Such created envelope can be used for fault detection and health monitoring of dynamic systems. The method includes the following steps: a) defining normal operation and identifying normal operation cases, b) retrieving event code sequences, c) preprocessing even code sequences, d) defining similarity measure, e) performing clustering, f) projecting high dimensional even code vectors to a 2-dimensional grid map, and g) determining healthy operating envelope.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method of detecting a fault in a dynamic aircraft system comprising:

a. recording event codes that occur during operation of a dynamic aircraft system during flights of an aircraft;
b. generating a database by storing the event codes as a stream of event code sequences represented by an m×n matrix having entries in the form of c(i, j), where m is the number of different event codes over a total number of flights, n is a total number of flights, and c(i, j) represents a number of counts or occurrences of an $i^{th}$ event code during a $j^{th}$ flight;
c. normalizing the occurrences of each $i^{th}$ event per flight by a total number of occurrences per flight to obtain a frequency of occurrence per flight that defines input vectors, each input vector represented by [f(i, j) . . . f(m,j)];
d. suppressing nuisance event codes by limiting the maximum frequency of each occurrence per flight to substantially twice the standard deviation of all occurrences per flight;
e. clustering the frequency of occurrence per flight of the input vector using a self-organizing map;
f. setting a quantization error threshold to be substantially equal to about three times the standard deviation of the differences between a prototype vector and all input vectors; and
g. detecting an error in the dynamic system when an input vector differs from the prototype by at least the amount of the quantization error.

2. The method of claim 1, further comprising normalizing the frequencies of occurrences per flight by duration to account for flight duration differences among different flights.

3. The method of claim 1, further comprising defining a healthy operating envelope in the operating range between the prototype vector and the quantization error threshold.

* * * * *